(12) United States Patent
Tanimoto

(10) Patent No.: US 7,180,637 B2
(45) Date of Patent: Feb. 20, 2007

(54) FACSIMILE MACHINES AND METHODS FOR OPERATING FACSIMILE MACHINES

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 938 days.

(21) Appl. No.: 10/172,215

(22) Filed: Jun. 14, 2002

(65) Prior Publication Data

US 2002/0196475 A1 Dec. 26, 2002

(30) Foreign Application Priority Data

Jun. 26, 2001 (JP) ............................. 2001-192841

(51) Int. Cl.
H04N 1/00 (2006.01)

(52) U.S. Cl. .................... 358/402; 358/468; 358/1.15; 709/246

(58) Field of Classification Search ................ 358/402, 358/1.15, 401, 471, 400, 468, 1.1; 709/246, 709/241
See application file for complete search history.

(56) References Cited

U.S. PATENT DOCUMENTS

| | | | |
|---|---|---|---|
| 6,252,681 B1 * | 6/2001 | Gusmano et al. ........... | 358/468 |
| 6,351,771 B1 * | 2/2002 | Craddock et al. .......... | 709/227 |
| 6,411,393 B1 * | 6/2002 | Wakasugi .................. | 358/1.15 |
| 6,735,617 B1 * | 5/2004 | Goodman ................... | 709/206 |
| 6,768,790 B1 * | 7/2004 | Manduley et al. ........ | 379/88.13 |
| 6,826,625 B1 * | 11/2004 | Fujise et al. ................ | 709/246 |
| 2002/0160757 A1 * | 10/2002 | Shavit et al. ............... | 455/414 |

FOREIGN PATENT DOCUMENTS

| | | |
|---|---|---|
| JP | 02-280457 | 11/1990 |
| JP | 03-068263 | 3/1991 |
| JP | 03-196767 | 8/1991 |
| JP | 04-172043 | 6/1992 |
| JP | 05-160979 | 6/1993 |
| JP | 06-152807 | 5/1994 |
| JP | 2001-026163 | 1/2001 |
| JP | 2002-185693 | 6/2002 |

* cited by examiner

Primary Examiner—Kimberly Williams
Assistant Examiner—Ashish K. Thomas
(74) Attorney, Agent, or Firm—Hogan & Hartson LLP

(57) ABSTRACT

Methods of operating facsimile machines are provided in which a priority table is stored that specifies printing priorities for different types of designated information. A message along with associated image data and first designated information and other messages having other associated image data and other designated information are received. The first designated information and other designated information are then detected. Printing of the associated image data is then controlled based on relative priority of the first designated information with respect to other designated information that have been detected. In one possible implementation, facsimile machines are provided that can include, for example, a receiving unit and control unit. When a first printing job is being executed that includes image data to be printed, the receiving unit receives a communication message having second printing job associated therewith. The second printing job includes other image data. The communication message includes designated information indicating that the second printing job is higher in a printing priority order than printing of the image data associated with the first printing job. The control unit interrupts execution of the first printing job, and executes the second printing job.

29 Claims, 4 Drawing Sheets

Fig.1 EMBODIMENT
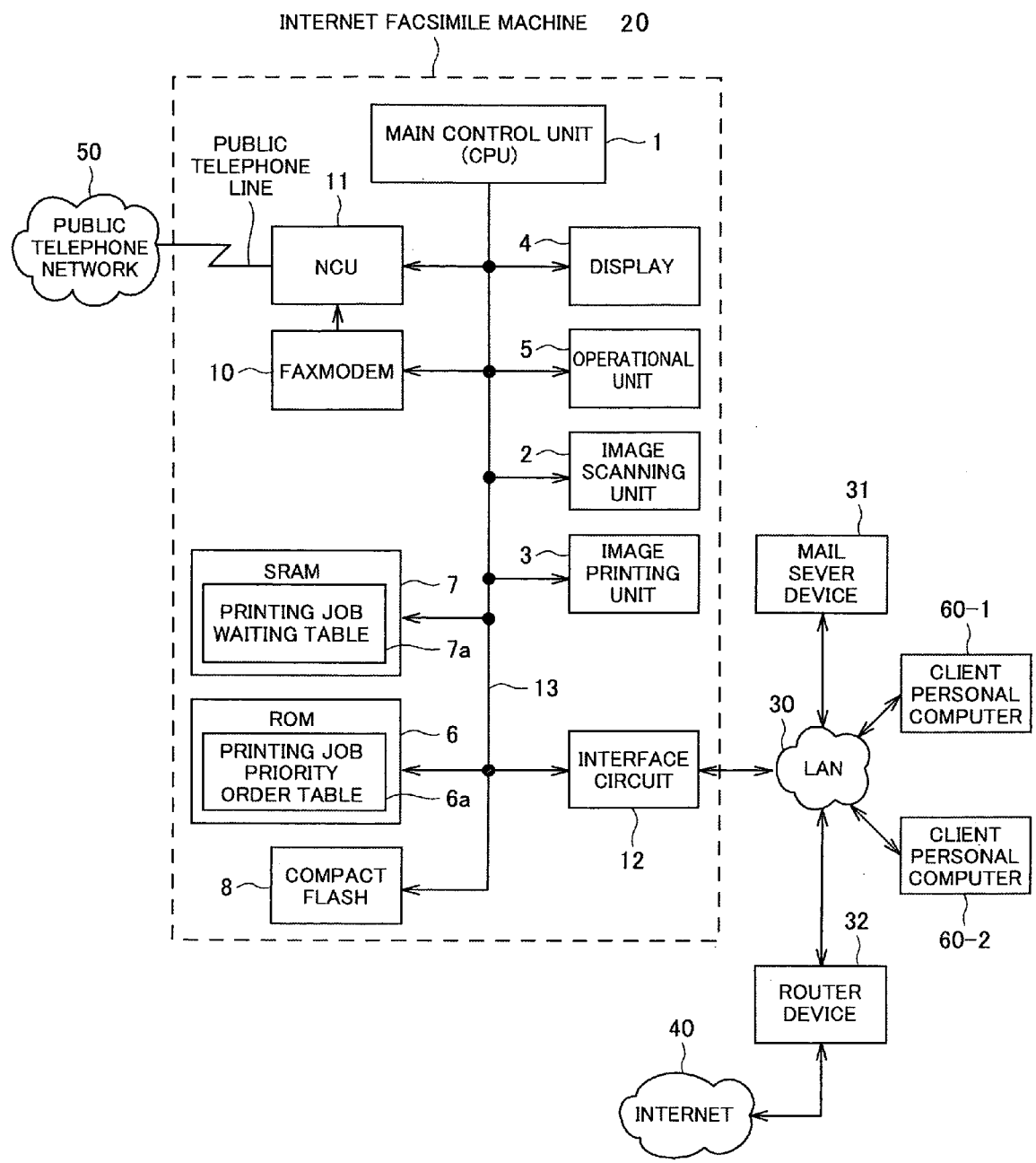

Fig.2 PRINTING JOB PRIORITY ORDER TABLE 6a

| DESIGNATED INFORMATION | PRIORITY ORDER | PRINTING SWITCH TIMING |
|---|---|---|
| URGENT MESSAGE | 5 | INTERRUPT AT THE END OF PAGE BEING PRINTED |
| master@abc.co.jp | 4 | INTERRUPT AT THE END OF PAGE BEING PRINTED |
| Notification | 3 | AT THE END OF PRINTING OF ONE FILE |
| Delivery Status | 3 | AT THE END OF PRINTING OF ONE FILE |
| TSI=81751234567 | 2 | AT THE END OF PRINTING OF ONE FILE |

Fig.3 PRINTING JOB WAITING TABLE  7a

| WAITING ORDER | FILE NAME | STATE | ADDRESS | SIZE |
|---|---|---|---|---|
| 0 | abcsmtp.txt | PRINTING | 0000 | 30kB |
| 1 | bcdnet.doc | PRINTER WAITING | 12FF | 78kB |
| 2 | cdepop.txt | PRINTER WAITING | 256F | 18kB |
| 3 | deffax.fax | PRINTER WAITING | 5633 | 256kB |
| ⋮ | ⋮ | ⋮ | ⋮ | ⋮ |

Fig.4 TRANSFORMED EXAMPLE
PRINTING JOB PRIORITY ORDER TABLE  6a

| DESIGNATED INFORMATION | DETECTING SECTION | PRIORITY ORDER | PRINTING SWITCH TIMING |
|---|---|---|---|
| URGENT MESSAGE | SUBJUCT HEADER | 5 | INTERRUPT AT THE END OF PAGE BEING PRINTED |
| master@abc.co.jp | FROM HEADER | 4 | INTERRUPT AT THE END OF PAGE BEING PRINTED |
| Notification | SUBJUCT HEADER | 3 | AT THE END OF PRINTING OF ONE FILE |
| Delivery Status | MAIN TEXT | 3 | AT THE END OF PRINTING OF ONE FILE |
| 81751234567 | TSI | 2 | AT THE END OF PRINTING OF ONE FILE |

FACSIMILE MACHINES AND METHODS FOR OPERATING FACSIMILE MACHINES

The present invention relates to facsimile machines comprising a receiving means for receiving a message along with an image data.

Internet facsimile machines are capable of carrying out a facsimile communications via Local Area Network (LAN) or Internet, as well as via a public telephone network. Such Internet facsimile machines must be adapted to generate printing jobs by G3 or G4 facsimile receiving. Such Internet facsimile machines must also be adapted to generate the following types of printing jobs:

(a) Printing jobs of image data that is received as part of an electronic mail attachment either via the LAN or the Internet by using Simple Mail Transfer Protocol (SMTP) or Post Office Protocol (POP). For example, the printing job by the Internet facsimile receiving based on the International Telecommunications Union (ITU) (Recommendation T.37 or T.38.)

(b) Printing jobs resulting from a copy function that use a scanner of a machine itself.

(c) Printing jobs received via the LAN from a client personal computer (commonly referred to as "network printing").

In conventional Internet facsimile machines, specific image data are typically serially executed according to an order that is based upon when the printing job was generated for that specific image data. The order in which specific image data is printed typically tracks the order in which specific image data is received by the facsimile machine. However, in conventional Internet facsimile machines it is not typically possible to select certain print image data with a preference so that printing of the selected types of print image data can be executed out of the specific order in which the print job for that selected print image data was generated. This is the case even when urgent image data or important image data arrive to conventional Internet facsimile machines.

Accordingly, there is a need for Internet facsimile machines in which image data can be printed with a preference such as when urgent or important image data are present.

SUMMARY OF THE PREFERRED EMBODIMENTS

Aspects of the present invention can provide methods of operating a facsimile machine.

According to aspects of the present invention, methods of operating a facsimile machine are provided. A first printing job that includes image data to be printed is executed. A communications message is then received having second printing job associated therewith that includes other image data. The communications message includes designated information indicating that the second printing job is higher in a printing priority order than printing of the image data associated with the first printing job. Execution of the first printing job is interrupted, and the second printing job is executed.

According to other aspects of the present invention, in some other methods of operating a facsimile machine, a priority table is stored that specifies printing priorities for different types of designated information. A message along with associated image data and first designated information and other messages having other associated image data and other designated information are then received. The first designated information and other designated information is then detected. Printing of the associated image data is then controlled based on relative priority of the first designated information with respect to other designated information that have been detected.

According to other aspects of the present invention, in some other methods of operating a facsimile machine, a plurality of messages with image data are received. Each of the messages includes associated priority information. The priority information associated with each of the received messages is then detected. A priority order table set with a printing priority order is then stored. A printing priority order for printing each image data is then set, wherein the printing priority order is determined by ordering priority information associated with each of the received messages based on the priority order table. When the image data of the printing job is received by the receiving means each image data can be printed based on the priority order.

Other aspects of the present invention can provide facsimile machines.

According to aspects of the present invention, some facsimile machines, can include, for example, a receiving unit, a detecting unit, a storing unit, and a control unit. The receiving unit can receive a message along with an image data. The detecting unit can detect a designated information from the received message. The storing unit can store a priority order table set with a printing priority order per prescribed designated information. When the image data of the printing job is received by the receiving unit, the control unit can set the priority order corresponding to the detected designated information based on the priority order table and controlling printing of each image data.

According to other aspects of the present invention, other facsimile machines, can include, for example, a storage unit, a receiving unit, a detecting unit, and a control unit. The storage unit stores a priority table that specifies printing priorities for different types of designated information. The receiving unit receives a message along with associated image data and first designated information, as well as other messages having other associated image data and other designated information. The detecting unit detects the first designated information and other designated information. The control unit controls printing of the associated image data based on relative priority of the first designated information with respect to other designated information that have been detected.

According to other aspects of the present invention, other facsimile machines, can include, for example, a receiving unit, a detecting unit, a storage unit, and a control unit. The receiving unit receives a plurality of communications. At least some of said communications include image data and priority information. The detecting unit detects the priority information for each communication including priority information. The storage unit stores a priority order table that defines printing priority of various types of priority information. The control unit sets the priority order responsive to the detected priority information for each communication including priority information. The priority order is based on the priority order table. The control unit then prints each image data according to the priority order that is set.

BRIEF DESCRIPTION OF DRAWINGS

The following discussion may be best understood with reference to the various views of the drawings, described in summary below, which form a part of this disclosure.

FIG. 1 is a block diagram illustrating an Internet facsimile machine that includes a printing job priority order function according to aspects of the present invention;

FIG. 2 is a view showing an example of a printing job priority order table that is adapted to be stored in the ROM of FIG. 1 according to other aspects of the present invention;

FIG. 3 is a view showing an example of a printing job waiting table that is adapted to be stored in the SRAM of FIG. 1 according to other aspects of the present invention; and FIG. 4 is a view showing another example of a printing job priority order table according to other aspects of the present invention.

DETAILED DESCRIPTION OF THE PREFERRED EMBODIMENTS

Aspects of the present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the size of functional units are exaggerated for clarity. Like numbers refer to like elements throughout As used herein, the term "one printing job" corresponds to "one file".

Practice of preferred aspects of the aspects of the present invention can provide facsimile machines that are capable of automatically printing, with preference, an urgent and/or important image data.

Aspects of the present invention can provide facsimile machines comprising a receiving means for receiving a message along with an image data, a detecting means for detecting a designated information from the received message, a storing means for storing a priority order table set with a printing priority order per prescribed designated information, and a control means that sets the priority order corresponding to the detected designated information based on the priority order table and that controls printing of each image data, when receiving the image data of the printing job by the receiving means. Therefore, by setting the priority order of the printing job according to the prescribed designated information within the received message, the urgent or important communication can be printed with preference according to the designating matters.

Furthermore, the storing means can preferably also store a detecting section within the message per designated information in the priority order table. The detecting means can preferably refer to the detecting section within the priority order table and detect the designated information from the received message. By storing the detecting section within the message per designated information in the priority order table, mistakes in the detection of the designated information can be reduced.

Moreover, when printing the image data of the first printing job, in the case the image data of the second printing job that is higher in the priority order is received by the receiving means, the control means can interrupt the first printing job that is currently being carried out, and can control printing, with preference, the image data of the second printing job that is higher in the priority order. Therefore, when image data of the second printing job is received that is higher in the priority order, the first printing job that is currently being carried out can be interrupted, and the image data of the second printing job that is higher in the priority order can be printed with preference. As a result, according to the designating matters, the urgent or important communication can be printed with preference.

Furthermore, during printing of the image data of the first printing job, if image data of the second printing job that is higher in the priority order is received by the receiving means, after ending the first printing job that is currently being carried out, the control means can control printing, with preference, of the image data of the second printing job that is higher in the priority order. Therefore, when receiving the image data of the second printing job that is higher in the priority order, after ending the first printing job that is currently being carried out, the image data of the second printing job that is higher in the priority order can be printed with preference. As a result, according to the designating matters, the urgent or important communication can be printed with preference.

Exemplary embodiments implementing aspects of the present invention will now be described with reference to the accompanying drawings.

FIG. 1 is a block diagram showing the structure of Internet facsimile machine 20. As will be described below, the Internet facsimile machine 20 is provided with a printing job priority order function according to aspects of the present invention.

The Internet facsimile machine 20 can be, for example, a facsimile machine for receiving a message along with associated image data. The message can include a header or a main text transmitted under an electronic mail format attached with the image data, and for example, a procedure signal, such as a Transmitting Subscriber Identification (TSI) signal or the like, under a facsimile communication procedure of T.30.

The Internet facsimile machine 20 can include a ROM (Read Only Memory) 6 that is configured to store a printing job priority order table 6a. The printing job priority order table 6a is set with a printing priority order per prescribed designated information. A main control unit 1 can detect the designated information from the received message. When receiving the image data of the printing job, the main control unit 1 can set the priority order corresponding to the detected designated information according to the printing job priority order table 6a. The main control unit 1 can then control printing of each image data.

If during printing of the image data of the first printing job, image data of a second printing job that is higher in the priority order is received, the main control unit 1 can interrupt the first printing job that is currently being carried out, and begin printing, with preference, the image data associated with the second printing job that is higher in the priority order. For example, when the second printing job of the image data includes designated information, such as "URGENT MESSAGE" in the Subject header of the electronic mail, the main control unit 1 can interrupt the first printing job that is currently being carried out, and print, with preference, the second printing job of the image data including this designated information.

In addition, if during printing of the image data of the first printing job, image data of the second printing job is received that is higher in the priority order, after ending the first printing job that is currently being carried out, the main control unit 1 begins printing, with preference, of the image data associated with the second printing job that is higher in the priority order. For example, when the second printing job of the image data includes designated information, such as "NOTIFICATION" in the Subject header of the electronic mail, after ending the first printing job that is currently being carried out, the main control unit 1 begins to print (or sends instructions to print), with preference, the image data of the second printing job that is higher in the priority order.

In FIG. 1, the Internet facsimile machine 20 includes facsimile communication functions of the conventional T.30, T.37, T.38 methods or the like, as well as a printing job priority order function.

The main control unit 1 can be a Central Processing Unit (CPU) that can be connected to each of the hardware parts mentioned below via a bus 13. The main control unit 1 can control the hardware parts, and carry out various software functions that will be described below.

An image scanning unit 2 can scan an original using a Charged Coupled Device (CCD) or the like. The image scanning unit 2 can output dotted image data converted into a binary.

An image printing unit 3 can be any printing device including electrophotographic printing devices. The image printing unit 3 can print out, for example, image data as a hardcopy. Image data can be received, for example, by facsimile communication from another facsimile machine.

Display 4 can be any known displaying device, such as a Liquid Crystal Display (LCD), a Cathode Ray Tube (CRT) display or the like. Display 4 can display, for example, an operational status of the Internet facsimile machine 20, the image data of the original to be transmitted, and the received image data.

Operational unit 5 can be provided with letter keys necessary for operating the Internet facsimile machine 20, a ten-key numeric pad for dialing, speed-dial keys, one-touch dial keys, and various function keys or the like. Further, by making the display 4 to be a touch-paneled type, it can be constructed to substitute a part or all of the various keys of the operational unit 5.

ROM 6 stores various software programs that might be necessary for the operation of the Internet facsimile machine 20, and that can be to be implemented by the main control unit 1. In addition, the ROM 6 stores the printing job priority order table 6a such as the one shown, for example, in FIG. 2. These programs can be recorded in a recording medium, for example, a floppy disk, Magneto-Optic (MO) disk, or Digital Versatile Disk-Random Access Memory (DVD-RAM). The programs can be carried out, for example, by loading to Static Random Access Memory (SRAM) 7 via the drive device when necessary.

SRAM 7 can store temporary data generated when the program is carried out by a working area of the main control unit 1. In this embodiment, the SRAM 7 stores a printing job waiting table 7a, such as that shown, for example, in FIG. 3.

Compact flash memory 8 serves as a commonly called image memory, and also as a memory of a program recording medium.

Faxmodem 10 can be connected to a public telephone network 50 via a public telephone line L, and can be a modem having faxmodem functions used for normal facsimile communication.

Network Control Unit (NCU) 11 can be, for example, a hardware circuit which carries out a closing and releasing operation of a current loop or the like of an analog public telephone line L, and can be provided with an automatic dialing function. When necessary the NCU 11 can connect the faxmodem 10 to the public telephone line L. The NCU 11 can detect the ID receiving terminal starting signal in caller ID displaying service, and the normal telephone calling signal. When necessary, the NCU 11 can transmit a first response signal and a second response signal in the caller ID displaying service. Further, the NCU 11 can be connected to a digital line of base band transmission method (for example, Integrated Services Digital Network (ISDN) line via a predetermined terminal adaptor and Digital Service Unit (DSU).

An interface circuit 12 can carry out signal conversion of a signal, data, or a protocol conversion for connecting the Internet facsimile machine 20 to the LAN 30 or the like, for example, Ethernet or the like. A mail server device 31, a router device 32, and client personal computers 60-1, 60-2 can be connected to the LAN 30.

Furthermore, the router device 32 can be connected to a mail server device (not shown) via the Internet 40. When transmitting the image data by attaching to the main text of the electronic mail from the Internet facsimile machine 20, after transmitting once to the mail server device 31 via the LAN 30 from the LAN interface 12, the mail server device 31 can transmit the Internet mail to the facsimile machine of the destination via the LAN 30, the router device 32, the Internet 40, and the mail server device of the other end (not shown).

Meanwhile, when receiving the Internet mail, it can be received through the path in the opposite direction. The method for receiving the Internet mail from the mail server device 31 can be using methods such as POP3 or SMTP. Further, the line connection to the Internet 40 is not limited to a private line or the like. For example, the line connection to the Internet 40 can be a dialup connection using the public telephone line L.

The Internet facsimile machine 20 also includes a printing job priority order function, in addition to the facsimile communication functions of the T.30, T.37, T.38 methods or the like. In the facsimile communication function, after the dotted image data scanned by the image scanning unit 2 is encoded by software, the dotted image data can be transmitted to the facsimile machine of the other end. Encoding methods such as Modified Huffman (MH), Modified Read (MR), or Modified Modified Read (MMR) can be used. Meanwhile, the encoded data received from the facsimile machine of the other end can be decoded into the image data by software and can be then be output as a hardcopy from the image printing unit 3.

In the Internet facsimile machine 20, the following printing jobs can be generated:

(a) printing jobs by the facsimile receiving using the communication procedures of ITU-T Recommendation T.30;

(b) printing jobs of the image data by receiving the electronic mail attached with the image data via the LAN 30 or the Internet 40 by using the SMTP or the POP, for example, the printing job by the Internet facsimile receiving based on ITU-T Recommendation T.37 or T.38;

(c) printing jobs by a copy function using a scanner of a machine itself; and/or (d) printing jobs received from the client personal computer 60-1 or 60-2 via the LAN 30, commonly called "network print".

When these printing jobs are generated, the main control unit 1 refers to the printing job priority order table 6a within the ROM 6, and detects the designated information in the message, such as the header part or the main text of the electronic mail, or the facsimile procedure signal or the like. The main control unit 1 can then determine the priority order in the queue of the printing job corresponding to the detected designated information. By using the printing job waiting table 7a within the SRAM 7, the priority order of the printing jobs can be controlled to manage the queue of the printing jobs of which printing or of which the printing is yet to be completed.

FIG. 2 is a view showing an example of the printing job priority order table 6a which can be stored in the ROM 6 of FIG. 1. As shown in FIG. 2, the printing job priority order table 6a can be used to store information including the priority order (in this drawing, for higher priority order, a larger number of priority level can be applied), and printing switch timing according to the designated information.

MESSAGE" is detected in the message, the associated printing job has the highest priority and a priority order of, for example, "5" can be set. If a printing job that is currently being carried out has a lower priority order, an interruption is called at the end of the page being printed. The printing job having the highest priority can then be carried out with a preference over other printing jobs. In other words, without waiting the end of the printing job that is being carried out, the printing job having the highest priority can be carried out with preference.

When the designated information for the printing job is detected showing a manager of the system "master@abc.co.jp" in the FROM header of the message, after the designated information "URGENT MESSAGE", the priority order is high and the priority order can be set, for example, at "4". Thus, when the printing job that is currently being carried out has a lower priority (e.g., is classified lower in the priority order), the interruption can be called at the end of the page that is being printed, and the printing job having the highest priority can be carried out in preference to the other printing jobs.

In addition, the printing jobs having the next highest priority order can be, for example, the printing job detected with the designated information "Notification" in the Subject header of the message, or the printing job detected with the designated information "Delivery Status" in the main text of the message. For such printing jobs, a priority order of, for example, "3" can be set. When the printing job that is being carried out or that is to be carried out is lower in the priority order, after the end of the printing of the printing job that is being carried out, the printing job is carried out in preference to the other printing jobs that are to be carried out. Furthermore, the printing job by T.30 facsimile receiving when the TSI signal is a predetermined telephone number, can be set with the priority order "2". Since this printing job has the lowest priority order, this printing job can be carried out after the end of the printing of the other printing jobs which have a higher priority order.

FIG. 3 is a view showing an example of the printing job waiting table 7a that can be stored in the SRAM 7 of FIG. 1. The printing job waiting table 7a of FIG. 3 can be used by the main control unit 1 to manage the queue of a plurality of printing jobs. The printing job waiting table 7a of FIG. 3 can also be used for storing information such as waiting order of the queue, the file name, the state (printing or printer waiting), the address of the image memory within the compact flash memory 8, and the size of the file.

In the Internet facsimile machine, the means for receiving the electronic mail, can be either SMTP receiving, POP3 receiving, or similar types of receiving. Normally, in the case of the SMTP receiving, the received mail is in the order transmitted by the mail server of the transmitting side. By contrast, in POP3 receiving, the received mail is processed and printed in the order downloaded from the mail box. However, under such circumstances, even when the urgent notification is included in the received mail, according to the order, there can be cases in which the other mails can be printed first, and until these mails are printed, such urgent notification can not be printed.

Therefore, a means can be provided for detecting and extracting the prescribed designated information from the received electronic mail or the procedure signal. Moreover, when the prescribed designated information is urgent, the image data attached to the electronic mail or the image data of the facsimile can be printed with preference. In addition, the prescribed designated information can be selected from several different kinds, and different priority orders can be given to each kind of prescribed designated information.

In some cases, the means for receiving the image data may be used in modes other than the facsimile receiving receiving mode. For example, the facsimile machine may include a means for receiving the image data of the original of some types, such as when an Internet facsimile machine function or a network print function is implemented. In this case, the priority order when printing the received original can also be assigned to the designated information. When an original that is higher in the priority order is received during the printing of a previously received original, such original can be printed with preference.

If during printing of a first original that is lower in the priority order, a second original that is higher in the priority order is received, then the timing to start printing of the image data of the second original that is higher in the priority order, with preference, can be set at the printing job priority order table 6a. For example, the printing job priority order table 6a can set the timing to start printing of the image data of the second original that is higher in the priority order, to either switch at the point when the printing of the image data file (or the printing job) of one original is ended, or to switch by the interruption at the point when the printing of the page being printed is ended.

As stated above, the ROM 6 stores the printing job priority order table 6a set with the printing priority order per prescribed designated information. Moreover, the main control unit 1 detects the designated information from the received message. When the image data of the printing job is received, the main control unit 1 controls to set the priority order corresponding to the detected designated information based on the printing job priority order table 6a, and then controls printing of each image data. Therefore, by setting the priority order of the printing job according to the prescribed designated information in the received message, according to the designated matters, the urgent or important communication can be printed with preference.

If during printing the image data of a first printing job, image data of a second printing job that is higher in the priority order is received (such as when the printing job of the image data includes the designated information such as "URGENT MESSAGE" in the Subject header of the electronic mail), the main control unit 1 in the Internet facsimile machine 20 can interrupt the first printing job that is currently being carried out. The main control unit 1 can then control printing, with preference, of the image data of the second printing job that is higher in the priority order. Therefore, when image data is received for a second printing job that is higher in the priority order, the first printing job that is currently being carried out can be interrupted, and the image data of the second printing job that is higher in the priority order can be printed with preference over the interrupted first printing job. As a result, according to the designated matters, the urgent or important communication can be printed with preference.

If during printing of the image data of a first printing job, the Internet facsimile machine 20 receives image data of a second printing job that is higher in the priority order (such as a printing job of image data that includes designated information such as "Notification" in the Subject header of the electronic mail), after ending the first printing job that is being carried out, the main control unit 1 can control printing, with preference, the image data of the second printing job that is higher in the priority order. Therefore, when receiving the image data of the second printing job that is higher in the priority order, after ending the first printing job that is currently being carried out, the image data of the second printing job that is higher in the priority order can be printed with preference. As a result, according to the designated matters, the urgent and important communication can be printed with preference.

While aspects of the present invention have been described in terms of certain preferred embodiments, those of ordinary skill in the will appreciate that certain variations, extensions and modifications may be made without varying from the basic teachings of the present invention.

For example, although the description above discusses an example of the Internet facsimile machine 20, the present invention is not to be limited to Internet facsimile machines, and can be applied to other communication terminal type devices such as a telephone set or a data communication device that can be connected to a public network such as the public telephone network or the public digital network.

Moreover, the printing job priority order table 6a is not necessarily limited to the structure shown in FIG. 2. For example, FIG. 4 illustrates another example of a printing job priority order table 6a according to aspects of the present invention. The printing job priority order table 6a shown in FIG. 4 additionally stores a detecting section in the message per designated information. In this case, the main control unit 1 can refer to the detecting section in the printing job priority order table 6a and can detect the designated information from the received message. By constructing in the manner stated above, mistakes in the detection of the designated information can be reduced.

As such, the present invention is not to be construed as limited to the specific preferred embodiments described herein. Rather, the scope of the present invention is to be determined from the claims, which follow.

What is claimed is:

1. A facsimile machine, comprising:
   a receiving unit adapted to receive a message along with an image data;
   a detection unit adapted to detect a designated information from the received message;
   a storage unit adapted to store a priority order table set with a printing priority order by type of designated information and including a detecting section associated with each type of designated information, wherein the detection unit refers to the detecting section within the priority order table to determine a section of the message in which the designated information should be detected; and
   a controller unit for setting the priority order corresponding to the detected designated information based on the priority order table and controlling printing of each image data, when receiving the image data of the printing job by the receiving unit.

2. A facsimile machine according to claim 1, wherein if the receiving unit receives another image data of a second printing job during printing of the image data of a first printing job that is currently being carried out, and printing of another image data of the second printing job is higher in the priority order than printing of the image data of a first printing job, the controller unit interrupts the first printing job that is currently being carried out, and controls printing of the another image data of the second printing job that is higher in the priority order.

3. A facsimile machine according to claim 1, wherein if the receiving unit receives another image data of a second printing job during printing of the image data of a first printing job that is currently being carried out, and printing of another image data of the second printing job is higher in the priority order than printing of the image data of a first printing job, after ending the first printing job that is currently being carried out, the controller unit controls printing of the another image data of the second printing job that is higher in the priority order.

4. A facsimile machine according to claim 1, wherein the receiving unit receives the image data and the message by an electronic mail and/or G3 facsimile communication.

5. A method of operating a facsimile machine, comprising:
   executing a first printing job that includes image data to be printed;
   receiving a communications message having second printing job associated therewith that includes other image data, wherein the communications message includes designated information indicating that the second printing job is higher in a printing priority order than printing of the image data associated with the first printing job, wherein the printing priority order is specified in a printing job priority order table by type of designated information, and each type of designated information is associated in the table with a detection section in the communication message where the designated information is found; and
   interrupting execution of the first printing job; and
   executing the second printing job.

6. A method according to claim 5, wherein the designated information is an "URGENT MESSAGE" reference in a Subject header of an electronic mail.

7. A method according to claim 5, wherein the designated information is a "Notification" reference in a Subject header of an electronic mail.

8. A method according to claim 5, wherein the image data and the communication message is received by an electronic mail and/or G3 facsimile communication.

9. A facsimile machine, wherein a first printing job that includes image data to be printed is being executed, comprising:
   a receiving unit configured to receive a communication message having second printing job associated therewith that includes other image data, wherein the communication message includes designated information indicating that the second printing job is higher in a printing priority order than printing of the image data associated with the first printing job;
   a printing job priority order table that sets the printing priority order by type of designated information and associates each type of designated information with a detection section in the communication message where the designated information is found; and
   a controller for interrupting execution of the first printing job, and executing the second printing job.

10. A facsimile machine according to claim 9, wherein the designated information is an "URGENT MESSAGE" reference in a Subject header of an electronic mail.

11. A facsimile machine according to claim 9, wherein the designated information is a "Notification" reference in a Subject header of an electronic mail.

12. A facsimile machine according to claim 9, wherein the receiving unit receives the image data and the message by an electronic mail and/or G3 facsimile communication.

13. A method of operating a facsimile machine, comprising:
storing a priority table that specifies printing priorities for different types of designated information and that associates a detecting section with each type of designated information in the priority table;
receiving a message along with associated image data and first designated information and other messages having other associated image data and other designated information;
detecting the first designated information and other designated information from a section of the message determined by reference to the detecting section within the priority table; and
controlling printing of the associated image data based on relative priority of the first designated information with respect to other designated information that have been detected.

14. A method according to claim 13, wherein the relative priority of all designated information that is received is established based on the printing priorities specified by the priority table.

15. A method according to claim 14, wherein controlling printing of the associated image data based on relative priority of the first designated information with respect to other designated information that have been detected, comprises:
interrupting printing of the image data that is currently being carried out, when the first designated information having a highest priority of all designated information that is received; and
executing printing of the associated image data.

16. A method according to claim 14, wherein controlling printing of the associated image data based on relative priority of the first designated information with respect to other designated information that have been detected, comprises:
after ending the printing of the image data that is currently being carried out, executing printing of the associated image data.

17. A facsimile machine comprising:
storing means for storing a priority table that specifies printing priorities for different types of designated information and that associates a detecting section with each type of designated information in the priority table;
receiving means for receiving a message along with associated image data and first designated information and other messages having other associated image data and other designated information;
detecting means for detecting the first designated information and other designated information from a section of the message determined by reference to the detecting section within the priority table; and
control means for controlling printing of the associated image data based on relative priority of the first designated information with respect to other designated information that have been detected.

18. A facsimile machine according to claim 17, wherein the control means establishes the relative priority of all designated information that is received based on the printing priorities specified by the priority table.

19. A facsimile machine according to claim 17, wherein when the first designated information has a highest priority of all designated information that is received, the control means interrupts printing of the image data that is currently being carried out, and executes printing of the associated image data.

20. A facsimile machine according to claim 17, wherein when the first designated information has a highest priority of all designated information that is received, the control means, after ending the printing of the image data that is currently being carried out, executes printing of the associated image data.

21. A method of operating a facsimile machine, comprising:
receiving a plurality of messages with image data, wherein each of said messages includes associated priority information;
detecting the priority information associated with each of the received messages;
storing a priority order table set with a printing priority order and that associates a detecting section with each type of priority information, wherein a section of each received message where the priority information should be detected is determined by referring to the detecting section within the priority order table;
setting a printing priority order for printing each image data, wherein the printing priority order is determined by ordering priority information associated with each of the received messages based on the priority order table; and
printing each image data, based on the priority order, when the image data of the printing job is received by the receiving means.

22. A method of operating a facsimile machine according to claim 21, further comprising:
when another image data having a higher priority than the image data is received by the receiving means, interrupting a first printing job of the image data currently being carried out; and
starting a second print job of the another image data with preference over the first printing job.

23. A method of operating a facsimile machine according to claim 21, further comprising:
after interrupting a first printing job of the image data currently being carried out, printing the another image data of the second printing job having a higher priority order with preference over the first printing job of the image data.

24. A method of operating a facsimile machine according to claim 21, wherein the image data and the message is received by one of an electronic mail, a facsimile communication, and equivalents thereof.

25. A facsimile machine, comprising:
means for receiving plurality of messages with image data, wherein each of said messages includes associated priority information;
means for detecting the priority information associated with each of the received messages;
means for storing a priority order table set with a printing priority order and that associates a detecting section with each type of priority information, wherein a section of each received message where the priority information should be detected is determined by referring to the detecting section within the priority order table;

means for setting a printing priority order for printing each image data, wherein the printing priority order is determined by ordering priority information associated with each of the received messages based on the priority order table; and means for printing each image data, based on the priority order, when the image data of the printing job is received by the receiving means.

26. A facsimile machine according to claim 25, further comprising:

means for interrupting a first printing job of the image data currently being carried out, when another image data having a higher priority than the image data is received by the receiving means; and means for starting a second print job of the another image data with preference over the first printing job.

27. A facsimile machine according to claim 26, further comprising:

after interrupting a first printing job of the image data currently being carried out, printing the another image data of the second printing job having a higher priority order with preference over the first printing job of the image data.

28. A facsimile machine according to claim 25, wherein the image data and the message is received by one of an electronic mail, a facsimile communication, and equivalents thereof.

29. A facsimile machine comprising:

a receiving unit configured to receive a plurality of communications, at least some of said communications including image data and priority information;

a detecting unit adapted to detect the priority information for each communication including priority information;

a storage unit adapted to store a priority order table, the priority order table defining printing priority of various types of priority information and associating a detecting section with each type of priority information, wherein the detecting unit refers to the detecting section within the priority order table to determine a section of the message where the priority information should be detected; and a controller unit that sets the priority order responsive to the detected priority information for each communication including priority information, wherein the priority order is based on the priority order table, and prints each image data according to the priority order that is set.

* * * * *